(12) United States Patent
Vannan et al.

(10) Patent No.: US 6,298,893 B1
(45) Date of Patent: Oct. 9, 2001

(54) PLY PATH CONTROLLED BY PRECURED APEX

(75) Inventors: Frederick Forbes Vannan, Clinton; Matthew Ray Cappelli, Canal Fulton; Arthur Allen Goldstein, Mayfield Village; Gary Edwin Tubb, Copley, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/380,355

(22) PCT Filed: Apr. 3, 1997

(86) PCT No.: PCT/US97/05542

§ 371 Date: Aug. 27, 1999

§ 102(e) Date: Aug. 27, 1999

(87) PCT Pub. No.: WO98/43836

PCT Pub. Date: Oct. 8, 1998

(51) Int. Cl.⁷ .............................. B60C 9/08; B60C 15/00; B60C 15/06

(52) U.S. Cl. .................... 152/541; 152/454; 152/539; 152/548

(58) Field of Search ..................... 152/541, 548, 152/558, 539, 454

(56) References Cited

U.S. PATENT DOCUMENTS

| | | |
|---|---|---|
| 948,064 | 2/1910 | Seiberling et al. . |
| 1,426,672 | 8/1922 | Radford . |
| 1,519,482 | 12/1924 | Bowerman et al. . |
| 2,497,226 | 2/1950 | McNeill . |
| 2,799,435 | 7/1957 | Abplanalp . |
| 3,381,736 | 5/1968 | Ford et al. . |
| 3,472,715 | 10/1969 | Weinbrenner et al. . |
| 3,482,814 | 12/1969 | Hedgewick . |
| 3,774,874 | 11/1973 | Clark . |
| 3,787,263 | 1/1974 | Yonekawa et al. . |
| 3,809,356 | 5/1974 | Doyel . |
| 3,837,986 | 9/1974 | Görter et al. . |
| 3,895,986 | 7/1975 | Komatsu et al. . |
| 3,933,967 | 1/1976 | Taylor . |
| 4,028,042 | 6/1977 | Goodfellow et al. . |
| 4,168,193 | 9/1979 | Brunet et al. . |
| 4,202,717 | 5/1980 | Seiberling . |
| 4,249,882 | 2/1981 | Koch et al. . |
| 4,790,892 | 12/1988 | Rach et al. . |
| 5,261,474 | 11/1993 | Lobb et al. . |
| 5,262,115 | 11/1993 | Tomlinson . |
| 5,374,324 | 12/1994 | Vinson et al. . |
| 5,429,168 | 7/1995 | Lobb et al. . |
| 5,526,863 | 6/1996 | Hodges . |
| 5,536,348 | 7/1996 | Clebina et al. . |

FOREIGN PATENT DOCUMENTS

| | | |
|---|---|---|
| 640 777 A | 12/1963 | (BE) . |
| 0 013 194 A | 7/1980 | (EP) . |
| 0 653 318 A1 | 5/1995 | (EP) . |
| 2 224 313 A | 10/1974 | (FR) . |

OTHER PUBLICATIONS

Patent Abstracts of Japan, vol. 096, No. 006, 28 Jun. 1996 & JP 08 048116 A (Bridgestone Corp), 20 Feb. 1996.

*Primary Examiner*—Adrienne C. Johnstone
(74) *Attorney, Agent, or Firm*—David L King (57) ABSTRACT

A tire (10) having a contoured precured bead filler or apex (40) with a contoured surface for directing the ply path (24A) of the cord reinforced carcass plies (24) is taught. The contour of the precured bead filler or apex (40) has a convex surface (42A) and concave surface (42B) that transition at an inflection location (T) at or below the rim flange (52) to which the tire (10) is to be mounted.

3 Claims, 8 Drawing Sheets

PLY PATH CONTROLLED BY PRECURED APEX

TECHNICAL FIELD

This invention relates to a radial ply pneumatic tire having a predetermined ply cord path.

BACKGROUND ART

Tire engineers have historically established the contours of tires by building a mold having a predetermined contour, placing green or unvulcanized tires with predetermined amounts of rubber on either side of the reinforcing plies into the mold, expanding the tire casing against the mold using an inflatable bladder and then applying heat and pressure to cure the tire.

The mold is built with annular bead forming rings that form the contour of the bead portion 200 of the tire 100. These bead rings have a molding surface that generally approximates the contour of the rim upon which the tire 100 will fit.

The ply 210 is anchored to the bead cores 200 and conventionally in prior art tires 100 has a working ply path between the bead core 200 and the belt packages 140. At the lower portion of the tire the bead core and the rim flange limits the amount of movement the ply cords 210 can take. At the upper portion of the tire circumferentially extending belt package limits the radial growth of the ply. At a location just under the belt lateral edges 150 the ply cords when tensioned take a contour that approximates a single radius of curvature $R_{UP}$. This single radius of curvature $R_{UP}$ is commonly called the "neutral ply line."

Figure 1:
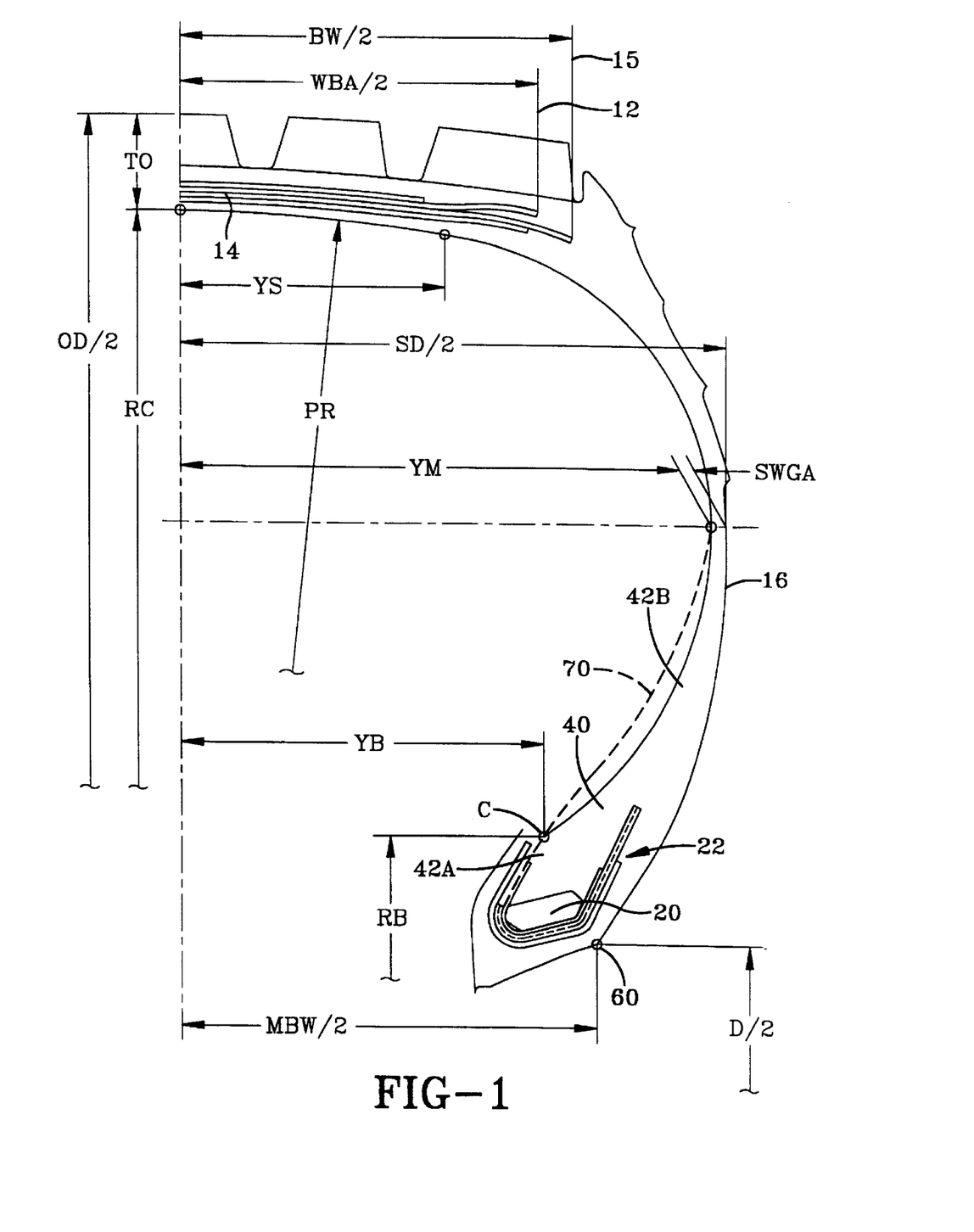
FIG. 1 is a schematic view of half of a cross section of a tire and its resultant geometry as discussed herein.

This single radius contour can only be held to a point as shown in FIG. 1. If the contour defined by $R_{UP}$ is maintained further a very steep curve is achieved that is axially extending at a location well above the rim flange of a conventional truck tire rim.

Ideally, one would like to optimize the ply cord path. One recent disclosure entitled "Tire With Reduce Bead Mass," is disclosed in U.S. Pat. No. 5,526,863. It is suggested that a reduced bead mass of as much as 15% can be achieved by using a small apex with an elongated constant thickness outer component and a large axially outer filler component. The U.S. Pat. No. 5,526,863 patent teaches adding a massive amount of rubber axially outward of the ply turnup. This in combination with the placement of the ply turnup axially inward adjacent the radially outer location of the rim flange effectively enables ply turnup to be moved toward the lower ply curvature above the rim flange such that the gap between the ply turnup and the ply path is a constant T from a distance F1 to below a location F2. This prior art tire had a slight improvement or reduction in tire mass with a corresponding reduction in rolling resistance. The ride performance was either better or worse dependent on the overall physical embodiment tested. Radial and cornering stiffness degraded with the lower dynamic spring rate. High speed capability was also worsened. This inventor seemed to believe that the lighter weight benefits outweighed the durability or performance reductions.

One inherent problem in the above-mentioned tires of the prior art is that the uncured rubber flows during vulcanization making the control of the ply path rather unpredictable.

A second and equally important problem is that the lower ply path must be altered to effectively anchor itself to the bead core. This is particularly true of conventional flange type rims. Those skilled in the art conventionally build a spline fit between the upper sidewall neutral contour and the lower sidewall. The resultant spline occupies the region between the maximum section width and the location radially near the bead flange. The spline fit has a very large radius of curvature often approximating an almost linear segment. In this portion of the ply, the ply path deviates from the neutral ply path, shear stresses develop that can generate heat and degrade the rolling resistance and durability of the tire. The tire of the present invention has a consistent ply path in the lower sidewall that has very low stresses. This lower ply path contour is controlled by a unique precured contoured apex that can minimize or even eliminate the use of a spline fit.

DESCRIPTION OF THE INVENTION

SUMMARY OF THE INVENTION

A tire 10 for mounting on a rim of a vehicle is disclosed. The tire 10 has a tread portion 12, a belt package 14 radially inward of the tread 12, a pair of sidewall portions 16 each extending radially inward from a lateral edge 15 of the belt package 14, a pair of beads 22 each having an annular bead core 20 and positioned radially inward of a respective sidewall portion 16, at least one carcass ply 24 located radially inward of the belt package and extending from bead 22 to bead 22. The at least one carcass ply 24 has radially extending parallel cords 24A and a pair of turnup ends 26, one turnup end is wrapped about each bead core 20 and extends radially outwardly to an end point positioned radially outwardly of a flange 52 of the rim 50. The tire 10 has a pair of precured bead filler portions 40, one precured bead filler portion 40 being adjacent to a radially outer surface of a bead core 20. The tire 10 is characterized by each precured bead filler 40 having an axially inner curvature 42. The axially inner curvature 42 is defined by a convex surface 42A and a concave surface 42B. The convex surface 42A is radially outwardly extending from axially inwardly of the bead core 20 to an inflection location T, the location T being substantially at or radially inward of a radially outer surface of the rim flange 52. The concave curvature 42B extends from the inflection location T to a radially outer end 41 located at or below the radial location of a maximum section width of the tire 10. The axially inner surface curvatures 42A,42B establishes a ply cord path 24A of the carcass ply 24 when the tire 10 is normally inflated and unloaded. The ply path 24A extends from radially above the rim flange 52 to the lateral ends of the belt package. The ply path 24A has a radius of curvature ($R_{UPL}$) between the belt lateral ends to the radial location H of the maximum section width and a second radius of curvature $R_{LPL}$ in the range of equal to or greater than $R_{UPL}$, preferably 100% to 200% $R_{UPL}$ between the location H and the location T. The inflection location T can be at a point or may include a short spline having a midpoint below the rim flange.

Definitions

"Aspect ratio" of the tire means the ratio of its section height (SH) to its section width (SW);

"Axial" and "axially" means lines or directions that are parallel to the axis of rotation of the tire;

"Bead" means that part of the tire comprising an annular tensile member wrapped by ply cords and shaped, with or without other reinforcement elements such as flippers, chippers, apexes, toe guards and chafers, to fit the design rim;

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"Carcass" means the tire structure apart from the belt structure, tread, under tread, and sidewall rubber over the plies, but including the beads;

"Circumferential" means lines or directions extending along the perimeter of the surface of the annular tread perpendicular to the axial direction;

"Chafers" refers to narrow strips of material placed around the outside of the bead to protect cord plies from the rim, distribute flexing above the rim, and to seal the tire;

"Chippers" means a reinforcement structure located in the bead portion of the tire;

"Cord" means one of the reinforcement strands of which the plies in the tire are comprised;

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Equatorial plane (EP)" means the plane perpendicular to the tire's axis of rotation and passing through the center of its tread;

"Footprint" means the contact patch or area of contact of the tire tread with a flat surface at zero speed and under normal load and pressure;

"Innerliner" means the layer or layers of elastomer or other material that form the inside surface of a tubeless tire and that contain the inflating fluid within the tire;

"Net-to-gross ratio" means the ratio of the tire tread rubber that makes contact with the road surface while in the footprint, divided by the area of the tread in the footprint, including non-contacting portions such as grooves;

"Normal rim diameter" means the average diameter of the rim flange at the location where the bead portion of the tire seats;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Ply" means a continuous layer of rubber-coated parallel cords;

"Radial" and "radially" means directions radially toward or away from the axis of rotation of the tire;

"Radial-ply tire" means belted or circumferentially-restricted pneumatic tire in which the ply cords which extend from the bead to bead are laid at cord angles between 65 degrees and 90 degrees with respect to the equatorial plane of the tire;

"Section height" (SH) means the radial distance from the nominal rim diameter to the outer diameter of the tire at its equatorial plane; and, "Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

BRIEF DESCRIPTION OF DRAWINGS

The invention may take physical form in certain parts and arrangement of parts a preferred and alternative embodiments of which will be described in detail in this specification and illustrated in the accompanying drawing which form a part hereof and wherein.

DETAILED DESCRIPTION OF THE INVENTION

In order to insure a complete and thorough understanding of the invention and an exemplary method of practicing this invention a detailed description of how one of ordinary skill can determine or develop a ply line for a radial ply pneumatic tire is discussed. For ease of understanding FIGS. 1 and 2 disclose abbreviations or initials that facilitate the understanding, the initials being similarly referred to in the text that follows. For a given tire 10 of a particular size, it is assumed at the outset that mold (OD), section diameter (SD) and molded base width (MBW) are known. It is also assumed that for the given tire application, the tread nonskid (NSK), undertread (UT), belt gages (BGA), and top ply coat (TPC) gage have been determined, and the mold ring sharp diameter and bead profile specifications are known, as well as the bead diameter.

The following gages and dimensions are also known from successful practice in prior art, viz: sidewall gage (SWGA), gum chafer gage, chipper gage, flipper gage, ply ending height (PEH), ply wire end-to-mold gage (T2), and ply wire end-to-ply gage (T1). It is assumed that tread width, tread radius and belt width have been determined from methods in standard practice. There are several methods to determine TAW. One such method is to use molded base width +/−5%.

Once the TAW is determined, the tread radius may be determined from the following construction: An angled line is drawn at −5 degrees through the mold OD point. The intersection of this line and a vertical line at TAW forms a point that may be reflected about the vertical axis. The tread radius is a circle through these three points.

The belts are then positioned concentric to the tread radius. A rule of thumb for max belt width is such that gage-to-mold at the widest belt is 0.55 (steer, trail), 0.60 (drive). It is also assumed here that belt step-offs are known and that an extruded wedge is placed between the working belts.

It is assumed that engineering calculations will be performed to verify required bead size, ply wire diameter and belt wire diameter. The calculations are normally done upon determination of the neutral contour line.

Neutral Contour Line Can be Established as Follows

Five input parameters are needed to specify a neutral contour ply line. These parameters are RC, YM, RB, YB, and PR (shown in FIG. 1). The parameters are sufficient to define a well known mathematical curve from point YS to point (RB,YB).

Figure 4:
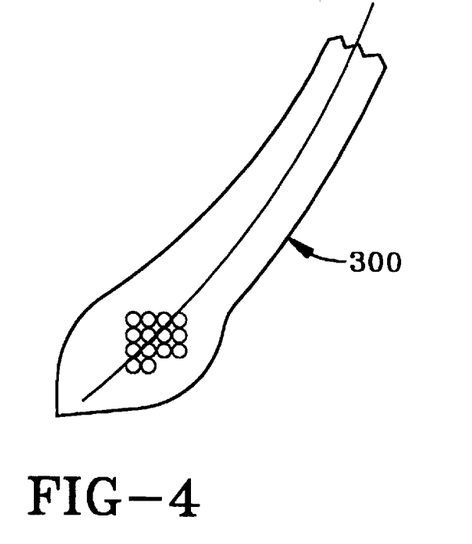
FIG. 4 is a cross sectional view of a neutral contour ply line in a theoretical tire as described by Purdy.

Purdy, J. F., "Mathematics Underlying the Design of Pneumatic Tires," Hiney Printing, 1963, teaches a theory or cord tension defining the neutral contour line for any tire. This neutral contour is as shown in FIG. 4.

Purdy states in Chapter VI of his book "Bead Tension" that "In chapters I & II the cord tension was defined for any tire as $$t = \frac{-\pi p(\rho_m^2 - \rho^2)}{N \sin\alpha \sin\phi} \quad 1)$$

and several terms of the equation were also defined. In the present case let N be the total number of cords in the v plies of a tire and p be the inflation pressure.

The component of cord tension tangent to the tire contour and in a radial plane is $$t \sin \alpha$$

and its component in the plane of any great circle of radius p is $$t \sin \alpha \cos \phi \quad 2)$$

This component of tension exerted by each cord of the tire results in a uniformly distributed force around a ring of radius P such as the steel ring to which the plies of a tire are anchored and which serves as a means of holding a tire on a wheel or rim. If n equals the number of tire cords per inch counted normally to the cord path, then over one inch of circumference of the ring of radius ρ there are n sin α cords in each ply, so that for v plies $$t\, n\Gamma\rho\sin^2\alpha \cos \phi = T_b \quad 3)$$

where $T_b$ is the tension in the steel anchor ring or bead as it is called.

From 1) we may substitute the value of t and have $$T_b = \frac{p}{2} \frac{(\rho_m^2 - \rho^2)\cos\phi}{\sin\phi} \quad 4)$$

remembering that in this case N=2πρn vsin α. Expanding the terms cos ø and sin ø by the equations of Chapter II we have $$T_b = \frac{p\sqrt{(\rho_o^2 - \rho_m^2)^2 - (\rho_m^2 - \rho^2)e^{2\int_\rho^{\rho_o}\frac{\cot^2\alpha}{\rho}d\rho}}}{2e^{\int_\rho^{\rho_o}\frac{\cot^2\alpha}{\rho}d\rho}} \quad 5)$$

as the bead ring tension in a tire of any cord path under the restricting condition that we will now describe.

It will be recalled that the equations of tire contour shape and curvature were derived for a surface of equilibrium between the tension in its cords and the inflation pressure. It is quite apparent that when, in the construction of a tire, the edges of the several plies are anchored to an inextensible steel ring by folding them around the ring and extending the fold to a diameter larger than that of the ring itself, a comparatively rigid structure is formed by the combination of steel anchor ring and plies of rubberized fabric.

If this inflexible structure were placed with its neutral contour coinciding with the neutral contour of the flexible tire 300, as in FIG. 4, equations 4) or 5) would define the tension in the steel anchor ring exactly.

Figure 5:
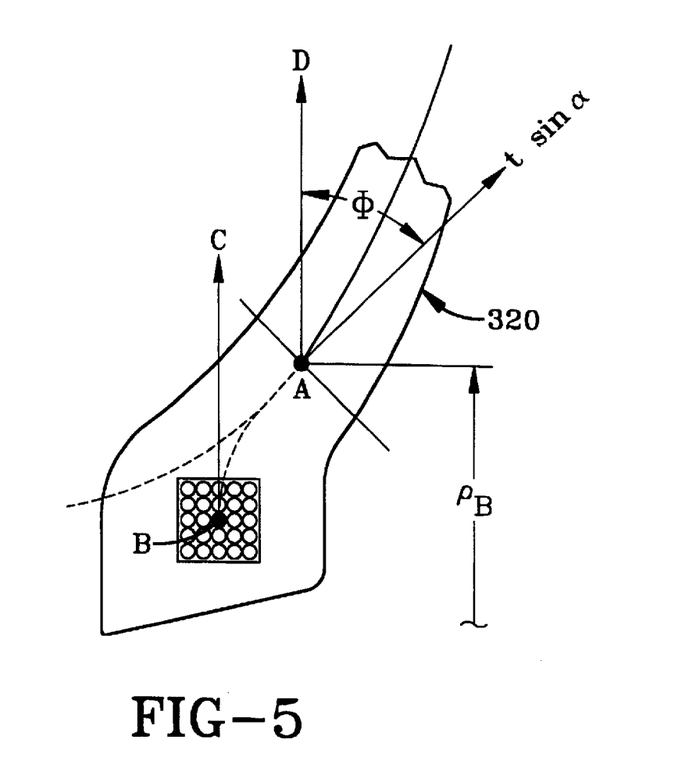
FIG. 5 is a cross section of a bead portion of a theoretical tire as disclosed by Purdy.

In most tires 320, however, the rigid structure of steel ring and surrounding rubberized cord material is shaped as in FIG. 5, and the neutral contour of the flexible tire 320 comes no where near the steel rink or the neutral contour of the rigid structure around it.

In this case if the cord pull is to be defined by equations 2) or 3) it will have to be defined at A where the flexible contour joins the rigid structure known in rubber-shop English as the tire "bead." The force along AD $$t\, n v \sin^2\alpha \cos \phi$$

in the type of bead tends to turn the structure about an axis through some point near B. An actual torsion does occur in many cases, but whether it does or not there are stresses in the bead structure that have presented persistent problems to the designer. As for tension in the steel anchor ring, equations 3) or 4) when computed at point A were not very reliable tensions in the steel ring at B. Instead of the component of cord pulls t n vsin²αcos ø consider the component t sin α as being transmitted over the arc AB to exert force BC on the steel ring in its own plane. We would then rewrite 4) as $$T_b = \frac{p(\rho_m^2 - \rho_b^2)\cdot k}{2\sin\phi_b} \quad 6)$$

as the tension in the ring at B, and where k is a factor that will correct for the manner in which the forces t sin a are transmitted from A to B."

Generation of this true neutral ply line curve is done numerically within a Computer Aided Drawing (CAD) program. At point YS, the curve is tangent to a circular arc extending from point RC to YS.

Specifying the Neutral Contour Line is accomplished using the following steps:

1. Determine the RC point by

RC=OD/2-TO where

TO=1.04*NSK+UT+BGA+TPC

2. Determine YM by subtracting required sidewall gage (SWGA) from SD/2.

3. In order to determine the RB,YB point the bead position must be established. The lateral position of the bead bundle is determined by first offsetting the upper portion of the mold ring in-board and parallel an amount BMG (equal to the sum of the gages of the gum chafer, fabric chafer, chipper, ply and flipper). The lower right-hand vertex of the bead wire bundle is then positioned axially on this line.

4. For determination of RB,YB, the upper portion of the mold ring is offset outboard and parallel 0.5". From the intersection of the mold sharp diameter line and this offset line, a line is drawn at 135 degrees to the horizontal. A vertical line is drawn through the center of the bead bundle. The intersection of the vertical line and the 135 degree line is the RB,YB point.

5. A neutral contour line may now be constructed with an estimate of the PR such that the YS point (edge of the constant radius PR) falls between 80–85% of dimension WBA, where WBA is the width of the belt covering the "wedge". Further estimates of PR may be used in an iterative fashion until the target YS is attained.

Revising the Upper Ply Contour Line

The neutral contour from the C/L to the shoulder is revised in order to provide uniform rubber gage between the split #1 belts. This standardizes the insert for plant efficiency.

Revising the Lower Ply Contour Line

While it is desirable to have the ply line follow the neutral contour line, in practice the steep approach angle (from the vertical) prevents the curing bladder from providing enough pressure to form the contour. Thus, the lower ply line is revised in the following manner:

A point X (see FIG. 2) on the mold surface is located at the intersection of the heel radius and the mold ring ledge. The ply ending 26 lies on a circular arc of radius PEH (centered at X) and is located a distance T2 from the mold surface (obtained by the intersection of the off-set mold surface and the PEH circle arc). Point E is then established on the inboard side of the ply ending 26 and a circle of radius T1 is then drawn to establish the distance to the ply 24 (see note 3).

Figure 2:
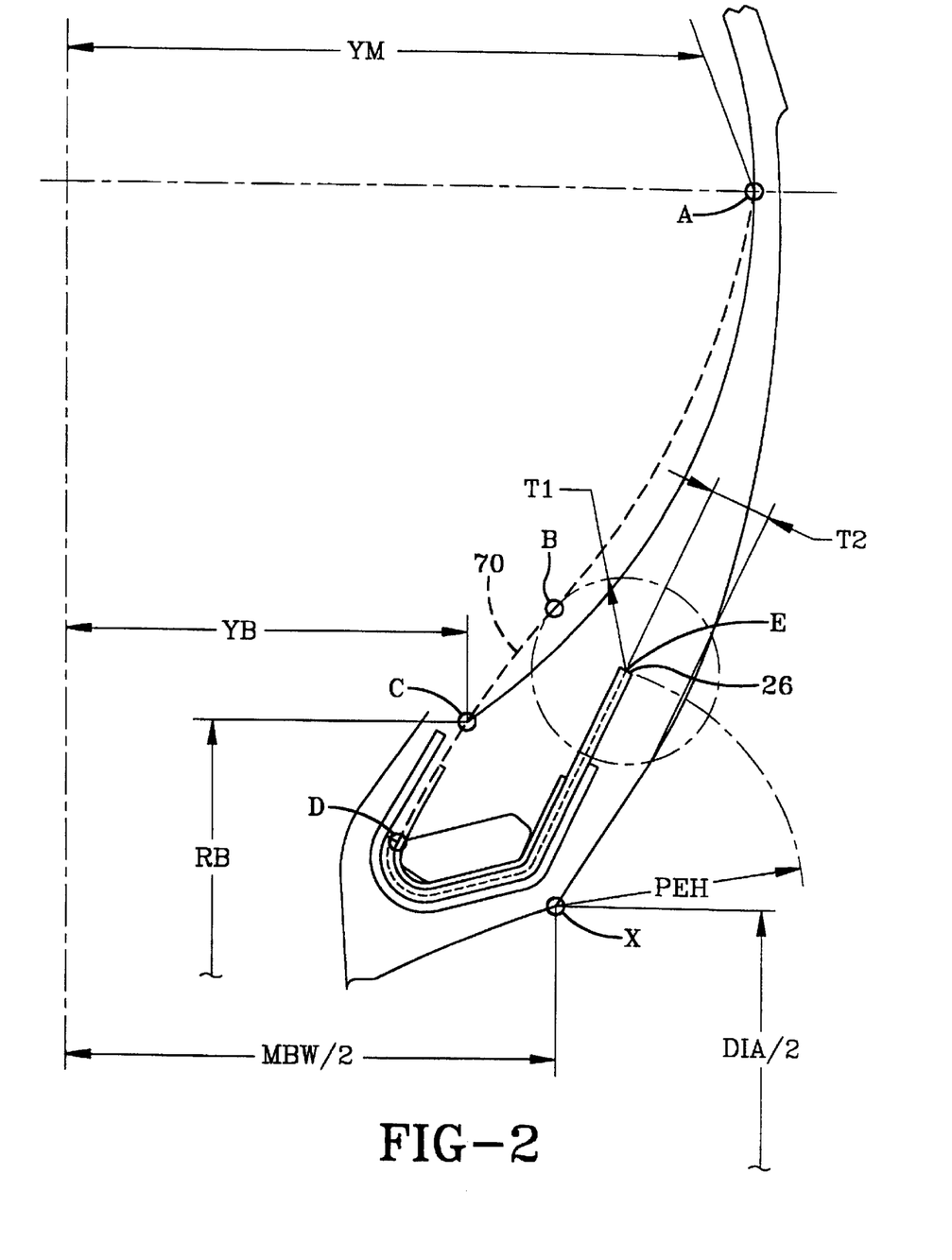
FIG. 2 is an enlarged schematic view of the lower bead portion of the tire of FIG. 1 and its resultant geometry.
Figure 3:
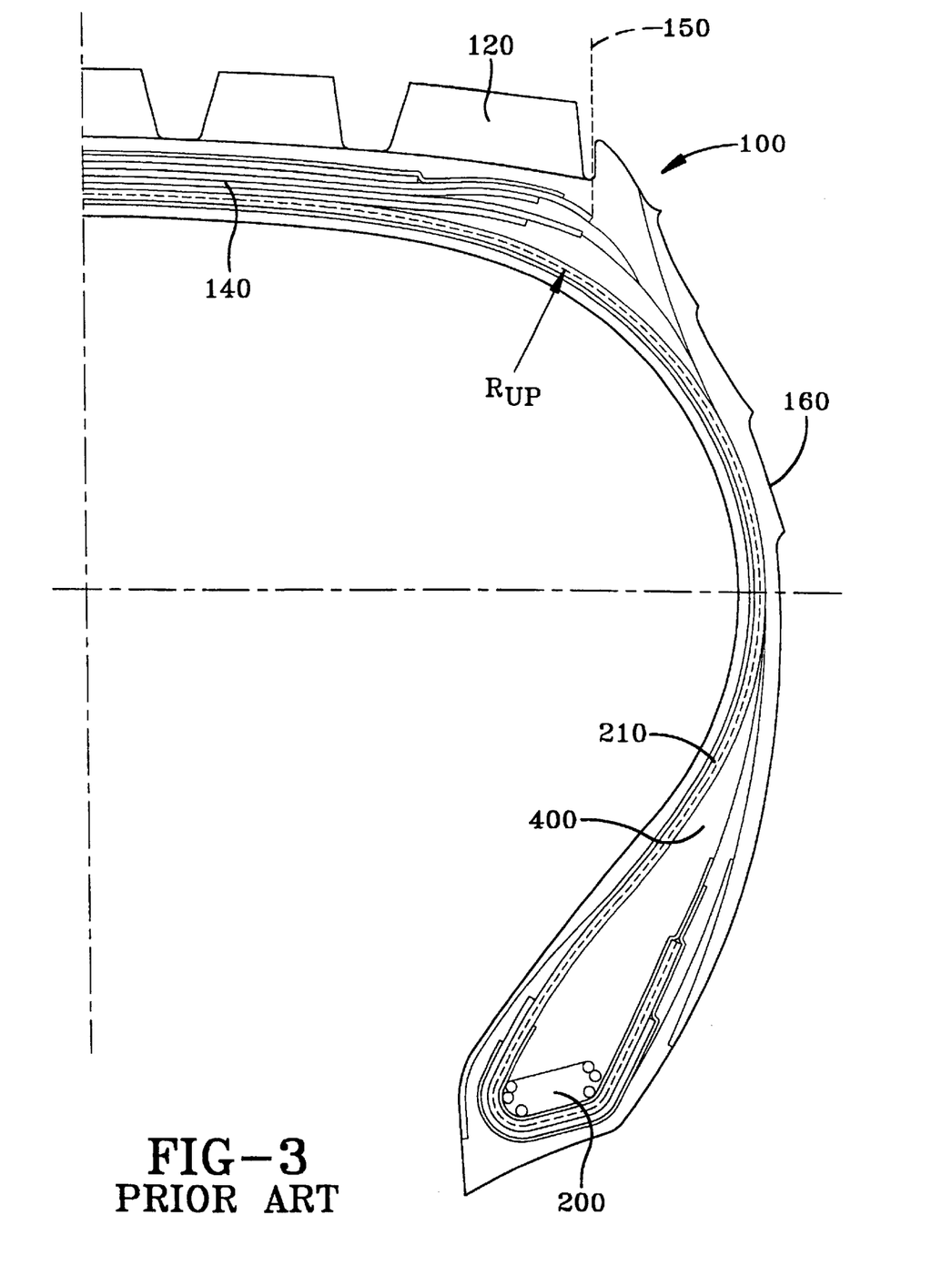
FIG. 3 is a cross sectional view of half of a prior art tire.

Note that at this point the appropriate ply gage and flipper gages have been laid in on the inboard side of the bead as concentric circular arcs. A spline 70 is then drawn through the YM point (point A), tangent to the circle centered at E (point B), and tangent to the ply circle (point D) on the inboard side of the bead (dashed line).

Figure 6:
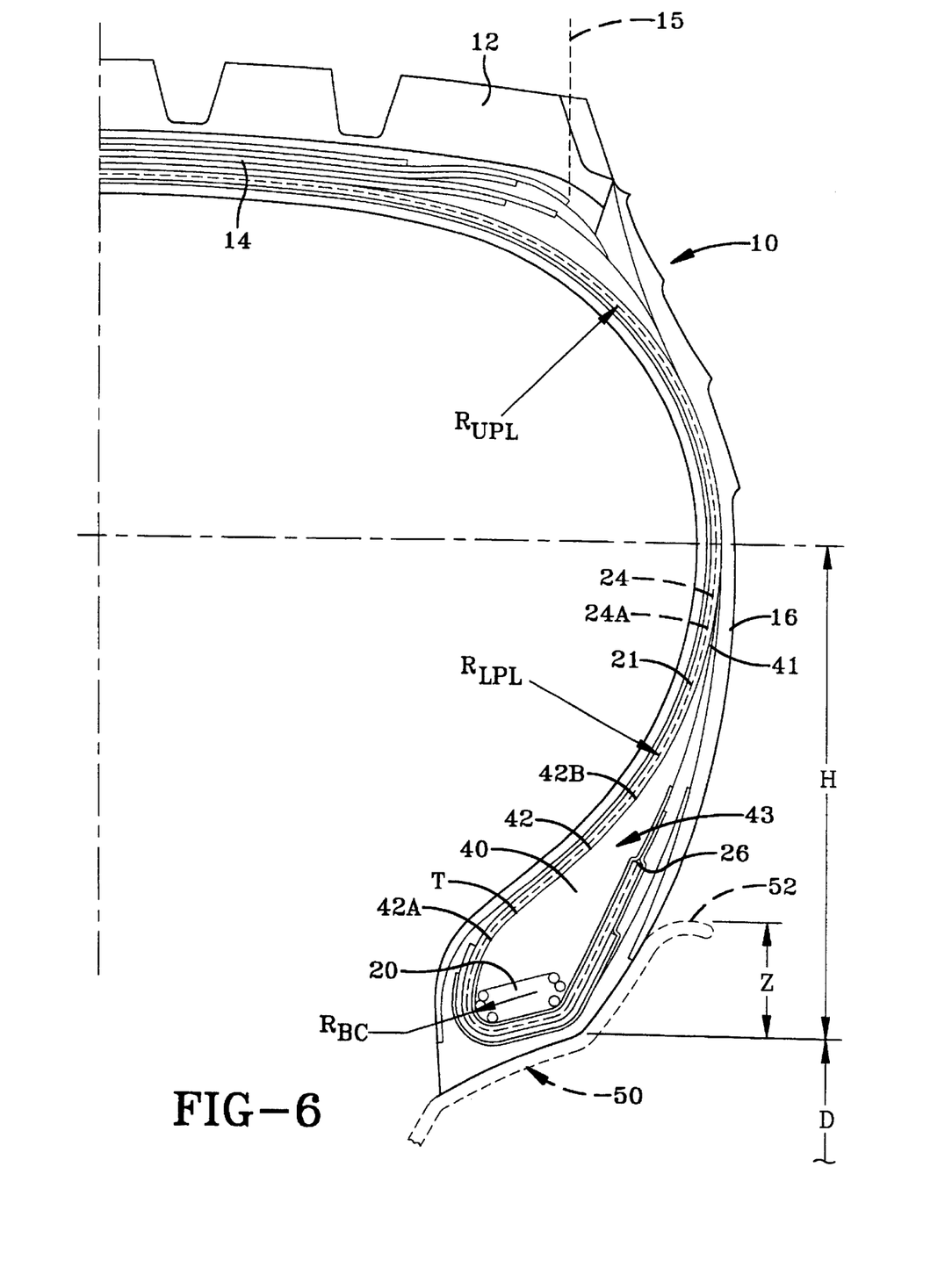
FIG. 6 is a cross sectional view of one-half of a tire made in accordance to the invention.
Figure 7:
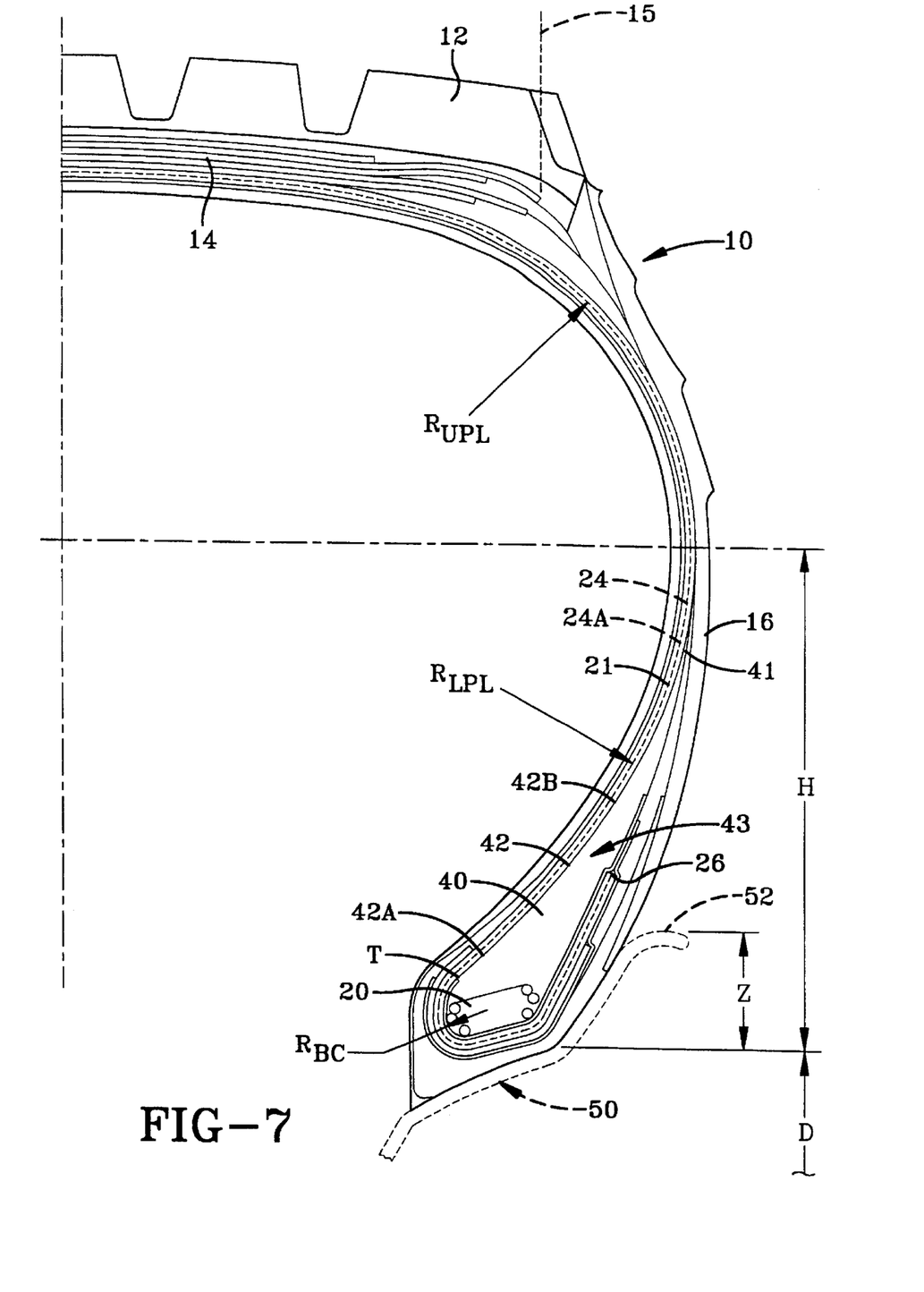
FIG. 7 is a cross sectional view of one-half of a second embodiment tire made in accordance to the invention.
Figure 8A:
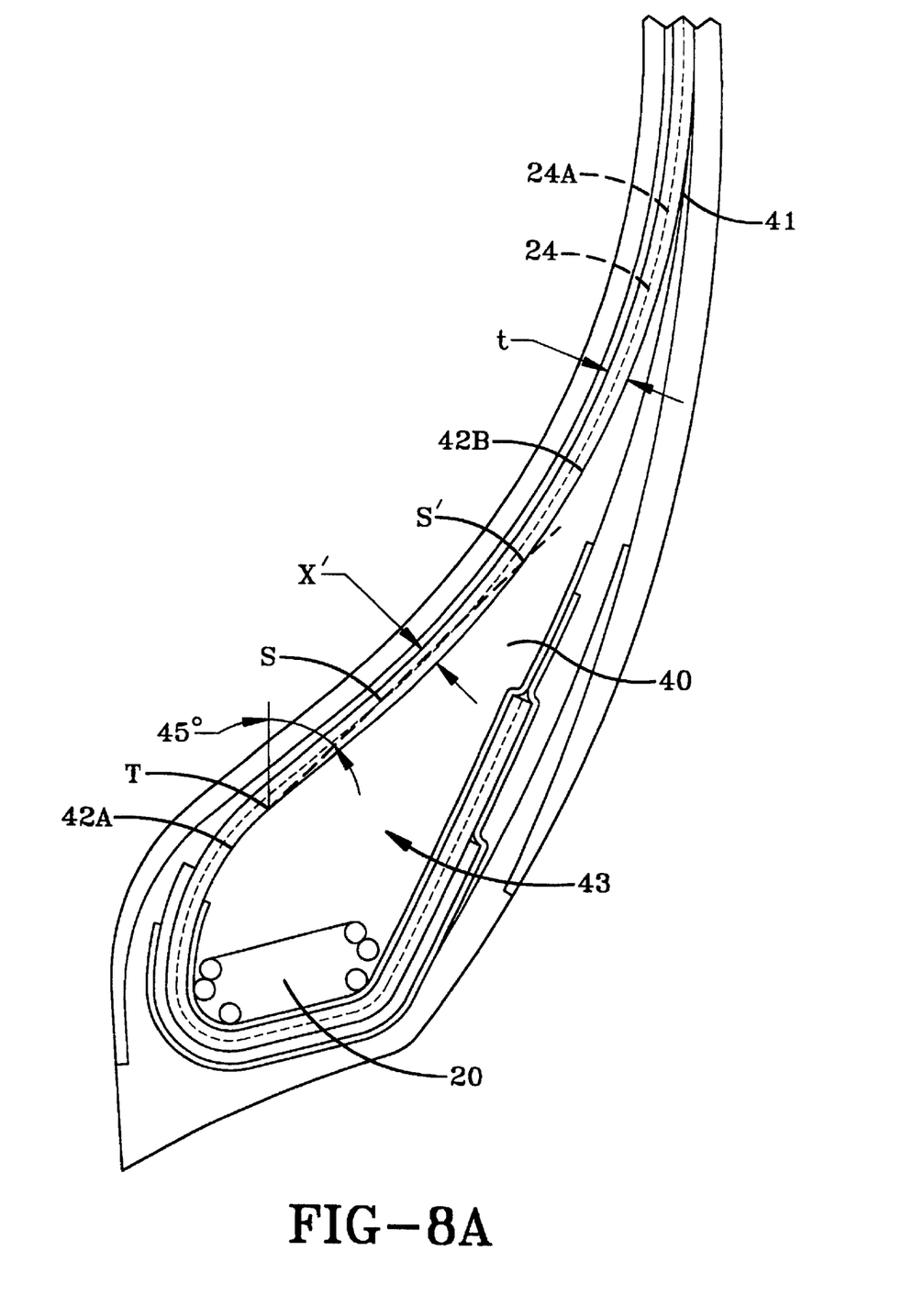
FIGS. 8A and 8B are enlarged views of the cross sections of the precured apex bead core assemblies according to the invention.
Figure 8B:
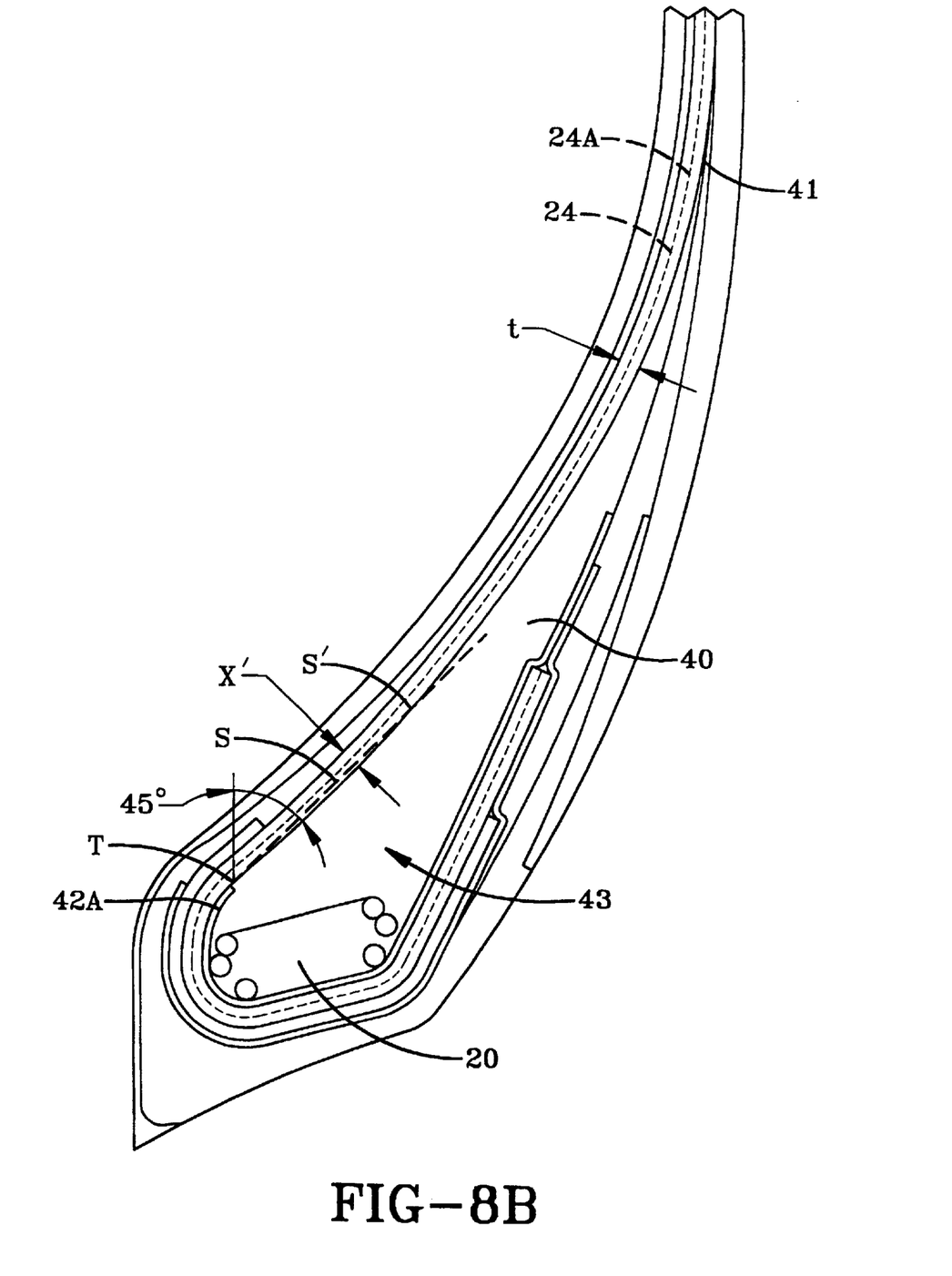

With the reference to FIGS. 6, 7 and 8, the use of a precured contoured apex 40 provides a surface 42 that maintain its profile during the vulcanization process.

By profiling the contour 42 of a precured apex 40 with a convex surface 42A axially inward of the bead core 20 and extending to a radial location T, location T being at or below radial height Z of the rim flange 52 of the design rim 50 that the tire 10 is to be mounted to, the contour 42 has an inflection point or short spline line at T wherein the axially inner surface becomes concave 42B, the concave surface 42B extending from the inflection point T to the radially outer end 41 of the apex 40, the radially outer end 41 being at or preferably slightly below the radial location H of the maximum section width SW of the tire 10.

When T is constructed as a short spline one preferred approximation of the spline T is established as a line tangent to the circular arc established by the $R_{LPL}$ radius and tangent to the circular arc adjacent the bead core 20. The average length of the spline T must be at or below the radial location Z of the rim flange Z. This insures that although a spline is used it must be very short in length and thus limits the amount of deviation from the optimal neutral contour line. From a geometric fit relationship as the $R_{LPL}/R_{UPL}$ ratio increases greater than 1.0, then the length of the spline T decreases to a point wherein the tangency of the circular arcs is a point T. Importantly, the location T, whether a point or the midpoint of the spline, must lie below the rim flange 52.

As can be seen from FIGS. 6, 7 and 8, the ply cord's lower path 24 below the maximum section width is dictated by the overall contour of the precured apex 40. The ply line 24A in the upper shoulder region has a single radius of curvature $R_{UPL}$, $R_{UPL}$ extending from below the belt 14 near the belt edges 15 to the maximum section width SW at the section width diameter SD. Near that location the curvature of the ply line transitions to a second lower radius of curvature $R_{LPL}$, $R_{LPL}$ is greater than or equal to $R_{UPL}$, preferably about 100% to 250% the radius $R_{UPL}$, more preferably about 125% to 200% $R_{UPL}$.

As shown in FIGS. 8A and 8B assuming one draws a line S tangent to the convex surface 42A of the precured apex 42 at an angle of 45° relative to the radial direction and then extends that line to intersection point $S^1$ on the axially inner concave surface 42B, the extension of line S will cover or extend between 50% and 100% of the precured apex 40 length lying below the intersection point $S^1$. The maximum distance $X^1$ between T and the $S^1$ between the line S and the ply line path 24 will be at least 1.0, preferably at least 2 times the thickness of the ply gauge (t).

The resultant tire 10 exhibits an approximately neutral contour to a radial location at or below the rim flange 52. This greatly reduces the shear stress of the cords and gives the tire 10 superior performance improvements. The fact that the deviation from the optimal ply path 24 occurs at a point wherein the rigid rim flange 52 and the bead core 20 can cooperatively constrain the cords 21 means that the overall durability adjacent the bead cores 20 is not diminished while the internal shear stresses along the ply line 24 have been dramatically reduced. This means the hysteretic heat generation and the associated reduced bead durability, high rolling resistance problems common in radial tires 10 can be reliably and uniformly reduced.

The precured apex 40 is believed most efficiently manufactured using injection molding however, compression molding of the apex can also achieve similar benefits as described above.

As used herein the term precured apex means that rubber flow associated with the vulcanization process cannot appreciably occur. Thus the term precured can also encompass partially cured rubber apex as long as the contour profile 42 can be maintained to provide the ply line 24A shape.

By using the contoured precured apex 40 which keeps its shape during molding the tire 10 as the adjacent green or unvulcanized components initiate the flowing cure state and as the tire cures and "sets-up" the ply path is fixed by the apex in combination with the mold.

It is believed best that the bead core 20 should be inserted into the apex forming mold to make a bead and precured apex assembly 43. This is naturally a method that further insures uniformity of these parts during tire assembly.

What is claimed is:

1. A tire for mounting on a design rim of a vehicle the tire having a tread portion, a belt package radially inward of the tread, a pair of sidewall portions each extending radially inward from a lateral edge of the belt package, a pair of beads each having an annular bead core and positioned radially inward of a respective sidewall portion, at least one carcass ply located radially inward of the belt package and extending from bead to bead, the at least one carcass ply having radially extending parallel cords and a pair of turnup ends, one turnup end being wrapped about each bead core and extending radially outwardly to an end point positioned radially outwardly of a flange of the rim, and a pair of precured bead filler portions, one precured bead filler portion being adjacent to a radially outer surface of a bead core; the tire being characterized by:

each precured bead filler having an inner curvature, the inner curvature defined by a convex surface and a concave surface, the convex surface radially outwardly extending from axially inwardly of the bead core to an inflection location T substantially radially inward of a radially outer surface of the rim flange, the concave curvature extending from the inflection location T to a radially outer end located below the radial location H of a maximum section width of the tire, the inner surface curvatures establishing a ply cord path of the at least one carcass ply when the tire is normally inflated and unloaded, the ply path extending from radially above the rim flange to the lateral ends of the belt package the ply path having a radius of curvature between the belt lateral ends to the radial location H of the maximum section width and a second radius of curvature $R_{LPL}$ in the range of 150% to 200% $R_{UPL}$ between the location H and the location T.

2. The tire of claim 1 wherein the location T is defined by a line having its midpoint below the radially outer surface of the rim flange, the line being a tangent line, tangent to the lower ply path radius of curvature $R_{LPL}$ and the convex curvature.

3. The tire of claim 1 wherein the location T is a point.

* * * * *